Figure 1:
Figure 2:
Figure 3:
Figure 4:
Figure 5:
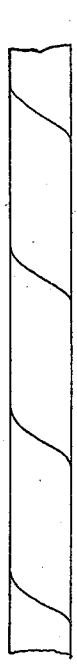
Figure 6:

No. 691,122. Patented Jan. 14, 1902.
C. ETZOLD.
APPARATUS FOR THE PRODUCTION OF SPIRALLY WOUND SHAVINGS.
(Application filed Apr. 16, 1900.)
(No Model.) 4 Sheets—Sheet 1.

Witnesses:

Inventor:
Curt Etzold,
by Church & Church
his attys.

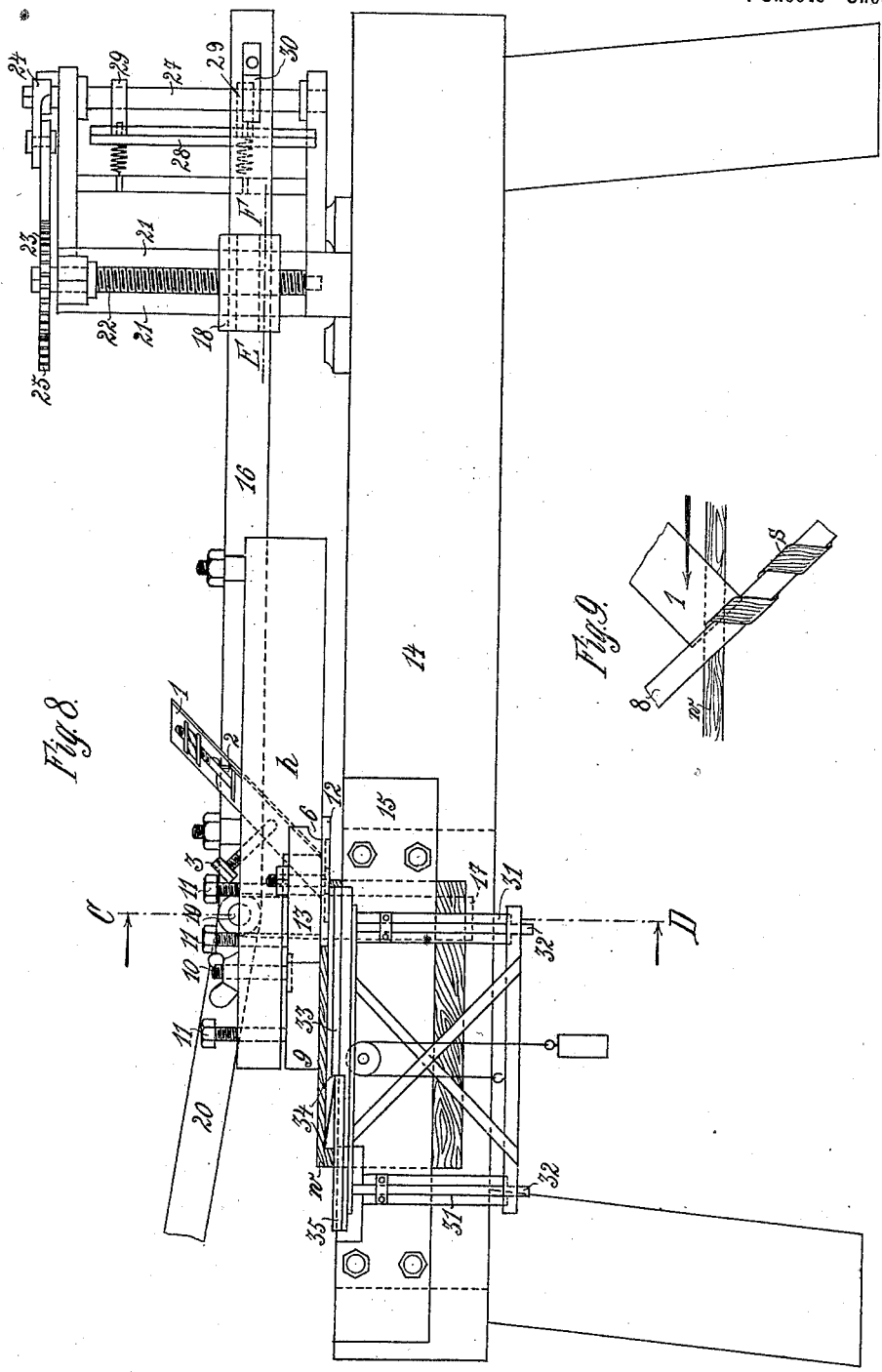

No. 691,122. Patented Jan. 14, 1902.
C. ETZOLD.
APPARATUS FOR THE PRODUCTION OF SPIRALLY WOUND SHAVINGS.
(Application filed Apr. 16, 1900.)
(No Model.) 4 Sheets—Sheet 3.
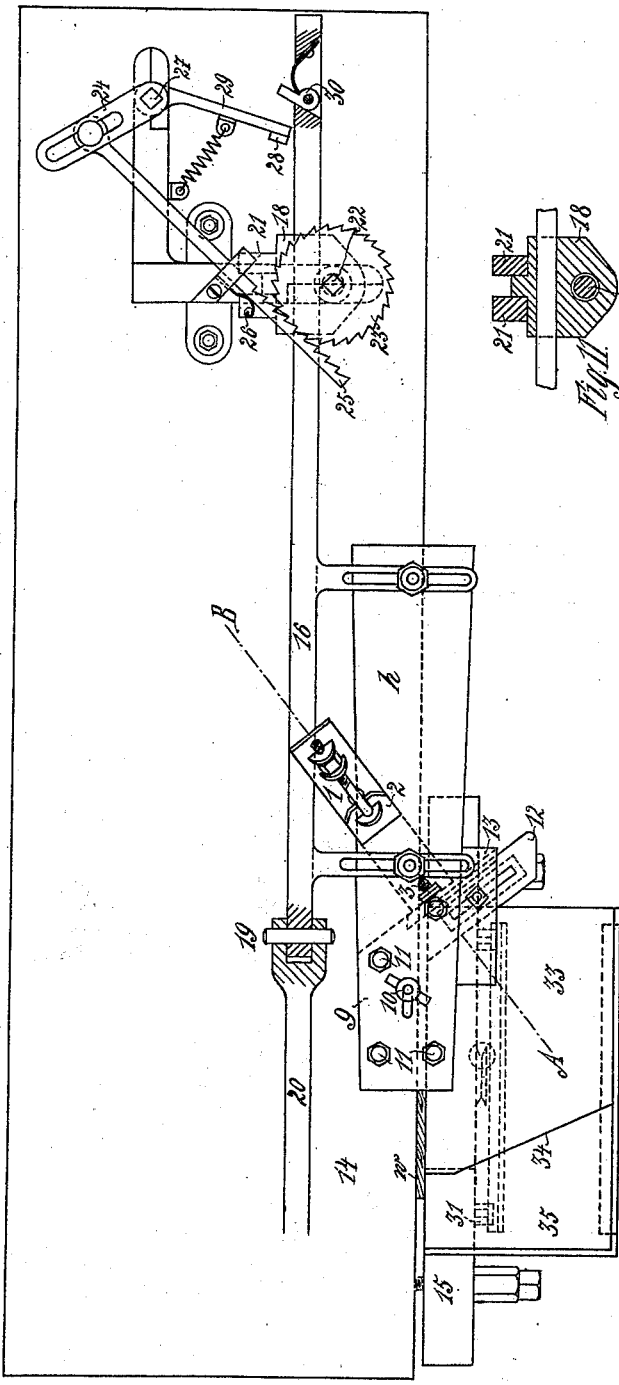
Witnesses:
Inventor:
Curt Etzold, No. 691,122. Patented Jan. 14, 1902.
C. ETZOLD.
APPARATUS FOR THE PRODUCTION OF SPIRALLY WOUND SHAVINGS.
(Application filed Apr. 16. 1900.)
(No Model.) 4 Sheets—Sheet 4.
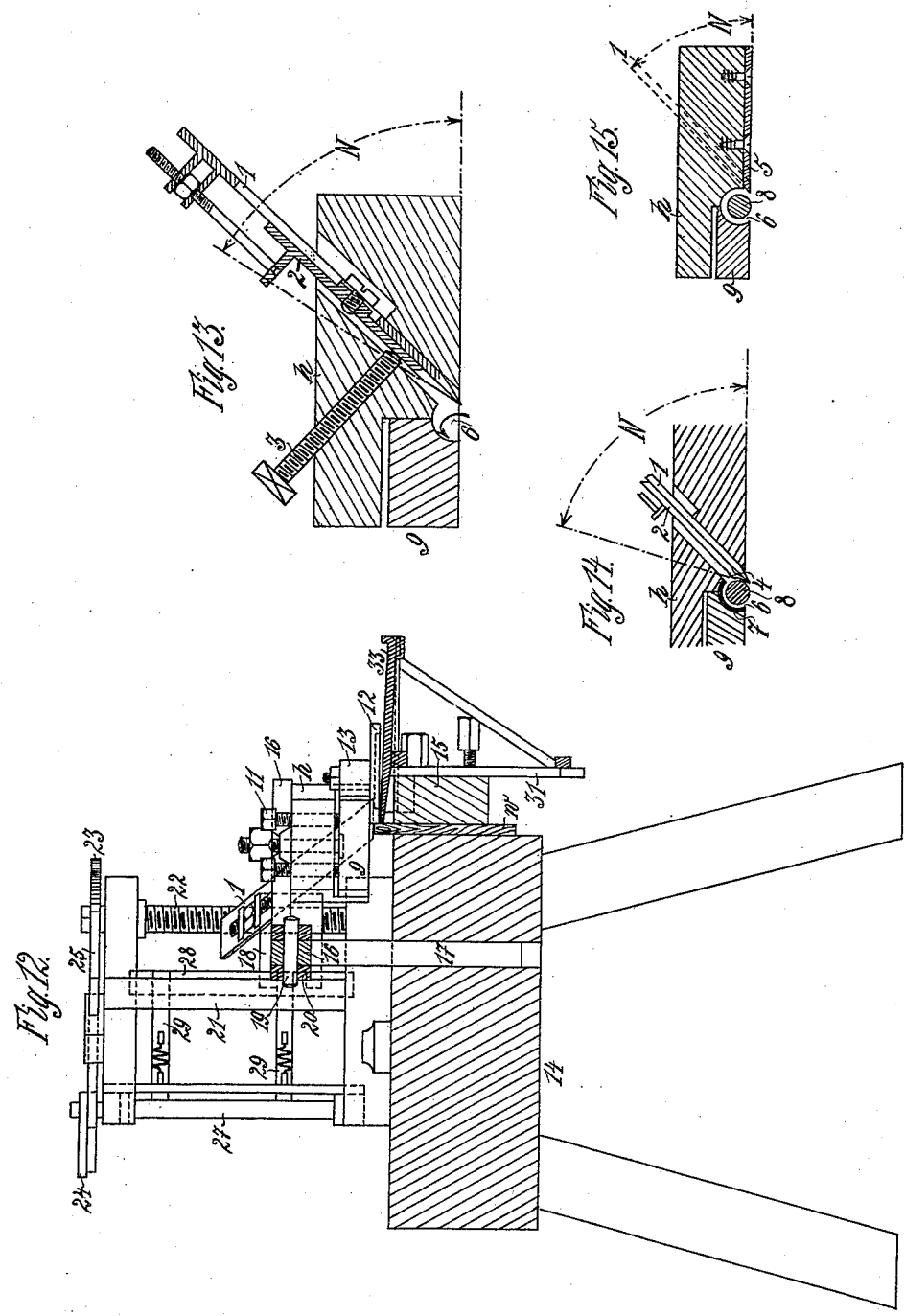

UNITED STATES PATENT OFFICE.

CURT ETZOLD, OF APOLDA, GERMANY.

APPARATUS FOR THE PRODUCTION OF SPIRALLY-WOUND SHAVINGS.

SPECIFICATION forming part of Letters Patent No. 691,122, dated January 14, 1902.

Application filed April 16, 1900. Serial No. 13,077. (No model.)

*To all whom it may concern:*

Be it known that I, CURT ETZOLD, a subject of the King of Prussia, German Emperor, residing at Apolda, Thuringia, Germany, have invented certain new and useful Apparatus for the Production of Spirally-Wound Shavings, (for which I have received Letters Patent in Germany, No. E. 6,610, I/38ª, dated September 18, 1899, and in France, No. 282,510, dated November 17, 1899,) of which the following is a specification.

The present apparatus is intended for use in the production of spirally-wound wooden shavings, such as are represented, by way of example, in Figures 1 to 7. These shavings are produced by a planing device with the edge of the blade arranged obliquely in the plane-stock and with a recess before the edge, (similar to that in a rabbet plane,) the plane being reciprocated in a predetermined manner over the block from which the shavings are cut in any convenient manner. The inclination of the surface which bends the shaving upward as it is formed—that is, of the front surface of the cutting-tool itself or a special device in the form of a break-iron—toward the holder must be of such magnitude as to bend the shaving beyond its limit of elasticity in order that it may remain bent or coiled in a comparatively small radius. At the same time the oblique position of the edge of the blade must be such that the shavings obtained will assume a spirally-wound tubular form, issuing automatically from the side of a recess in the plane-stock. The minimum limit of the said inclination may be fixed at thirty degrees, while the minimum angle formed by the edge of the iron, with a line crossing the body at right angles to the direction of the plane's reciprocating movement, may be about twenty degrees. With an increase of the first-named angle the radius of the winding decreases, while with an increase of the second angle the thread or pitch of the spiral increases. By suitably varying these two angles and cutting shavings of a suitable thickness shavings may be obtained the edges of which have a free space between them, Figs. 1 and 2, or which adjoin, Figs. 3 to 5, or even overlap each other.

Figs. 1 to 7 represent various examples of shaving coils or spirals produced by the apparatus. Fig. 8 is an elevation of the machine, partly in section. Fig. 9 is a plan sketch illustrating the way the shavings are formed. Fig. 10 is a plan view of the machine; Fig. 11, a section on the line E F of Fig. 8. Fig. 12 is a vertical section on the line C D of Fig. 8; Fig. 13, a vertical enlarged section on line A B of Fig. 10. Figs. 14 and 15 are similar sections indicating modifications in the construction of the plane.

The growth or formation of such a shaving is clearly represented in Fig. 9, in which $w$ represents the block of wood or material from which the shaving is to be cut, 1 the plane-iron, set obliquely in the manner described and moving in the direction indicated by the arrow, and $s$ the shaving. The iron 1 is preferably provided with a break-iron 2, Figs. 8, 10, and especially Fig. 13, for the same reasons which apply to its employment in the case of ordinary planes. This double iron is fixed in the plane-stock in a position of double obliquity by means of a screw 3, Figs. 8 and 13. A large angle N can be obtained without an inconveniently upright position of the iron 1 by suitably bending or forming the end of the break-iron 2 in the manner represented at 4, Fig. 14. According to Fig. 15 the iron 5 is flat and horizontal and screwed to the sole of the plane. Here, however, the surface produced by the sharpening of the iron coincides with the oblique plane otherwise occupied by the front surface of the iron 1, arranged in the usual manner and represented, for the sake of comparison, in dotted lines in Fig. 15. In all these variations the recess 6 is arranged in front of the iron edge and parallel to it—*i. e.,* considering it from a plan point of view in backward oblique direction. In order to render the recess as smooth as possible it may be provided with a metal lining 7, Fig. 14.

Concentrically with the recess may be arranged a pin 8, Figs. 9, 14, and 15, around which the shaving winds for the purpose of supporting, guiding, and protecting it against breaking until the whole length is taken off the block or strip of material. This guide-pin is secured in that part of the stock which is beyond the side edges of the iron and into which the recess on one side is not continued, for it is not necessary that the recess should be continued beyond the corner of the cutting edge—i. e., through the whole width of the plane-stock. In the form of construction of the complete machine as represented in Figs. 8, 10, and 12 this pin is substituted by a table to be described hereinafter.

The portion of the sole situated in front of the iron consists of a separate part $q$, Figs. 8, 10, 12, 13, 14, and 15, which may be adjusted vertically by means of screws or bolts 10 and fly-nuts and pressure-screws 11 for the purpose of regulating the thickness of the shaving to be cut.

The plane is guided along the edge of the work $w$ by means of a parallelogram-shaped guide-plate 12, Figs. 8, 10, and 12, projecting against the sole of the plane and displaceably arranged on a block 13 of the stock $h$, so arranged as to slide along the edge of the work. The recess 6, of course, is continued through the block 13, Fig. 8.

The work $w$ is held in the clamp 15 on the long side of a bench 14. The plane-stock is fastened to the slotted horizontal arms of a rod 16, as illustrated in Fig. 10, the rod being guided by an arm 17, Figs. 8 and 12, projecting downward and movable in a slot in the bench-plate. At its other end the rod passes through a nut 18, Figs. 8, 10, and 11. The rod 16 is articulated at 19 to a connecting-rod 20, which is reciprocated in any suitable manner. The nut 18 can move up or down without revolving between two vertical rails 21, being guided therein by a projection on one of its sides, as represented in Fig. 11, while it can be raised or lowered by turning a screw-rod 22, which passes through it. For this purpose a rack 25, acting as a pawl and adjustably carried by a lever-arm 24, gears with a ratchet-wheel 23, keyed on the rod 22, the rack engaging with the teeth and partly rotating the wheel 23 during its forward movement and sliding over the teeth during the reverse movement. A vertical shaft 27, on which the arm 24 is mounted, carries two arms 29, connected by a rail 28, the latter forming a long lever-arm, which is necessary owing to the varying height of the rod 16. Against this lever-arm a spring-finger 30, Fig. 10, strikes at each return stroke of the rod 16, while it passes under the arm, moving against the resistance of its spring during the forward movement. It will thus be seen that at each back stroke of the rod 16 the shaft 27 will be partly rotated and the rack 25 moved forward, turning the wheel 23 to the extent of several teeth, thereby correspondingly lowering the nut 18, and with it the rod 16, to an extent equal to the thickness of a shaving.

In vertical guides 31, arranged on the front side of the clamp 15, Fig. 8, are arranged vertically-movable rods 32 of a bracket-shaped frame, Fig. 12, supporting a table 33, slanting somewhat downwardly in an outward direction. A weight, Fig. 8, tends to raise the table-frame in such a manner that the table always presses against the guide-rail 12, receding to a lower level as it is pressed downward by the sinking plane. The table 33 is intended to support the shaving as it issues from the plane and is drawn along by it, the shaving falling over an edge 34, Figs. 8 and 10, onto a lower platform 35, provided with projecting edges, where it remains until removed.

It will be easily understood that with the plane-iron 1 placed in a contrary direction to that represented in Fig. 10 the shaving will be wound in a contrary direction.

Figure 7:
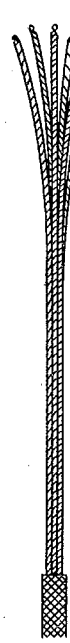

The product of such machines may be applied to a great variety of purposes. The finest and most delicate shavings, Fig. 7, are intended, among other purposes, for ornamenting ladies' hats and for the construction and ornamentation of useful and fancy articles of every description, such as, for instance, high-class basket-work and the like. Hats may also be made in the manner of straw hats of the stronger shavings. Braids stained on both sides would yield shavings with colored edges. By suitably cementing together the partly overlapping edges of the windings of such shavings or by arranging a left-hand coiled tube in a right-hand coiled tube and suitably cementing them, Fig. 6, tubes may be produced, and by inserting or attaching bottoms to them hollow measures, vessels, or receptacles can be made in a very simple manner.

What I claim as my invention, and desire to secure by Letters Patent, is—

1. In an apparatus such as described, the combination with the plane, provided with a rounded recess in front of the cutting edge of the blade, of a round rod arranged concentrically in said recess, for supporting the shaving.

2. In an apparatus such as described, the combination with the plane, the rod carrying the plane, means for reciprocating the rod, the vertical screw-shaft, the nut on said shaft through which the rod passes, the guides for the nut, the ratchet on the screw-shaft, the rack-bar coöperating with the ratchet, the pivoted lever-arm, on one end of which the ratchet-bar is carried, the pivoted pawl carried by the reciprocating rod, adapted to strike the end of the pivoted lever, on the backward movement of the rod, whereby the screw-shaft will be turned and the rod carrying the plane lowered, substantially as described.

3. In an apparatus such as described, the combination with the plane, the reciprocating rod 16 carrying the plane, the vertical screw-shaft, the nut on said shaft, through which the rod 16 is adapted to slide, the ratchet-wheel at the top of the screw-shaft, the rack-bar coöperating with said ratchet to turn the screw-shaft, the bell-crank lever, in one arm of which is adjustably mounted the end of the rack-bar, the pawl on the rod 16 adapted to strike the other arm of the bell-crank lever; substantially as described.

4. In an apparatus such as described, the combination with the reciprocating plane, a vertically-movable table or platform extending under the side of the plane, and means for yieldingly holding said table in elevated position, whereby the table may be depressed by the plane to the level of the work.

In testimony whereof I have signed my name to this specification in the presence of two subscribing witnesses.

CURT ETZOLD.

Witnesses:
OTTO HENNICKE,
CARL ESCHNER.